(12) United States Patent
Phillips et al.

(10) Patent No.: US 12,546,353 B2
(45) Date of Patent: Feb. 10, 2026

(54) COUPLING ELEMENT FOR AN ARTICLE OF FURNITURE

(71) Applicant: Ovvotech Innovations Limited, Newry (GB)

(72) Inventors: Sean Phillips, Newry (GB); Donal Phillips, Newry (GB)

(73) Assignee: Ovvotech Innovations Limited, Newry (GB)

( * ) Notice: Subject to any disclaimer, the term of this patent is extended or adjusted under 35 U.S.C. 154(b) by 572 days.

(21) Appl. No.: 17/801,957

(22) PCT Filed: Feb. 22, 2021

(86) PCT No.: PCT/EP2021/054284
§ 371 (c)(1),
(2) Date: Aug. 24, 2022

(87) PCT Pub. No.: WO2021/170526
PCT Pub. Date: Sep. 2, 2021

(65) Prior Publication Data
US 2023/0081500 A1   Mar. 16, 2023

(30) Foreign Application Priority Data
Feb. 28, 2020   (GB) .................................. 2002910

(51) Int. Cl.
*F16B 12/24* (2006.01)
*A47B 47/04* (2006.01)
(Continued)

(52) U.S. Cl.
CPC ............ *F16B 12/24* (2013.01); *A47B 47/042* (2013.01); *F16B 5/0024* (2013.01);
(Continued)

(58) Field of Classification Search
CPC .. A47B 2230/0037; F16B 12/24; F16B 12/26; F16B 13/02
See application file for complete search history.

(56) References Cited

U.S. PATENT DOCUMENTS

| 5,125,442 A | 6/1992 | Hendrickson |
| 6,364,586 B1 | 4/2002 | Okada |

(Continued)

FOREIGN PATENT DOCUMENTS

| AT | 250646 B | * 11/1966 | ............. F16B 13/02 |
| CN | 207830302 | 9/2018 | |

(Continued)

OTHER PUBLICATIONS

International Search Report and Written Opinion of the International Searching Authority from corresponding Patent Cooperation Treaty (PCT) Application No. PCT/EP2021/054284, indicated completed on Apr. 29, 2021.

(Continued)

*Primary Examiner* — Michael P Ferguson
(74) *Attorney, Agent, or Firm* — Gardner, Linn, Burkhart & Ondersma LLP

(57) ABSTRACT

A coupling element includes at least one coupling member having a first end and a second end, wherein the coupling member has a flat face on a first side thereof, at least one barb extending in cantilever manner from the flat face and depending away from the first end so as to hinder or prevent the removal of the coupling element from a bore in a surface of a first article into which the coupling member has been inserted from the first end.

10 Claims, 9 Drawing Sheets

(51) Int. Cl.
- *F16B 5/00* (2006.01)
- *F16B 12/12* (2006.01)
- *F16B 13/02* (2006.01)
- *F16B 21/08* (2006.01)

(52) U.S. Cl.
CPC ............ *F16B 12/125* (2013.01); *F16B 13/02* (2013.01); *F16B 21/084* (2013.01); *A47B 2230/0037* (2013.01); *A47B 2230/007* (2013.01)

(56) References Cited

U.S. PATENT DOCUMENTS

| | | | |
|---|---|---|---|
| 6,651,400 B1 | 11/2003 | Murphy | |
| 8,104,989 B2 * | 1/2012 | Liu | F16B 12/22 403/353 |
| 8,641,315 B2 * | 2/2014 | Liu | F16B 12/26 403/353 |
| 9,714,673 B2 | 7/2017 | Phillips | |
| 9,810,253 B2 * | 11/2017 | Koelling | F16B 12/22 |
| 10,197,081 B2 * | 2/2019 | Koelling | A47F 5/10 |
| D883,077 S * | 5/2020 | Koelling | F16B 12/24 D8/382 |
| 11,255,364 B2 | 2/2022 | Phillips | |
| 2019/0055973 A1 | 2/2019 | Nitschmann et al. | |
| 2019/0211859 A1 * | 7/2019 | Liu | F16B 12/26 |
| 2024/0401624 A1 | 12/2024 | Phillips et al. | |

FOREIGN PATENT DOCUMENTS

| | | | |
|---|---|---|---|
| DE | 29608207 | 8/1996 | |
| EP | 0 995 915 A2 * | 10/2000 | F16B 19/00 |
| FR | 1546888 A | 11/1968 | |
| FR | 2233883 | 1/1975 | |
| GB | 2061371 | 7/1983 | |
| WO | 2013080160 A1 | 6/2013 | |

OTHER PUBLICATIONS

UK Search Report of corresponding Application No. GB2002910.4, dated Jun. 23, 2020.

* cited by examiner

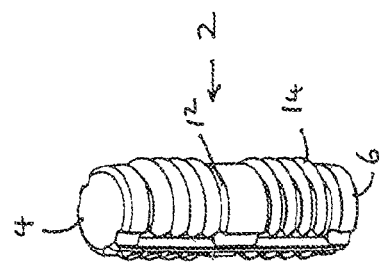
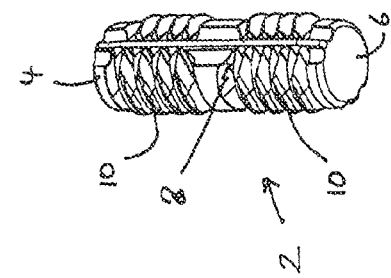
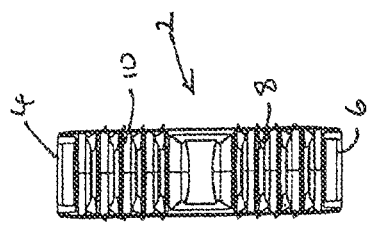
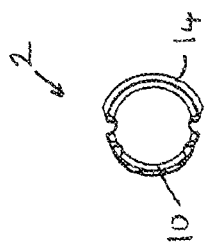
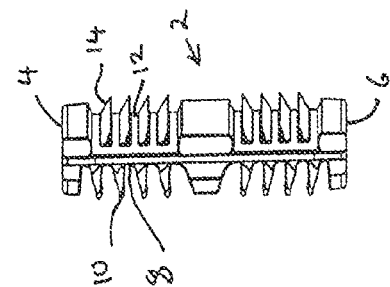
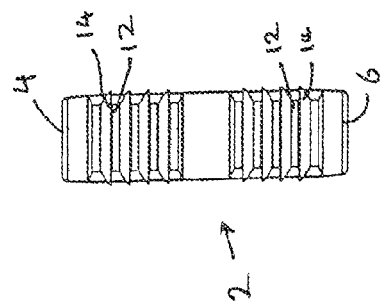

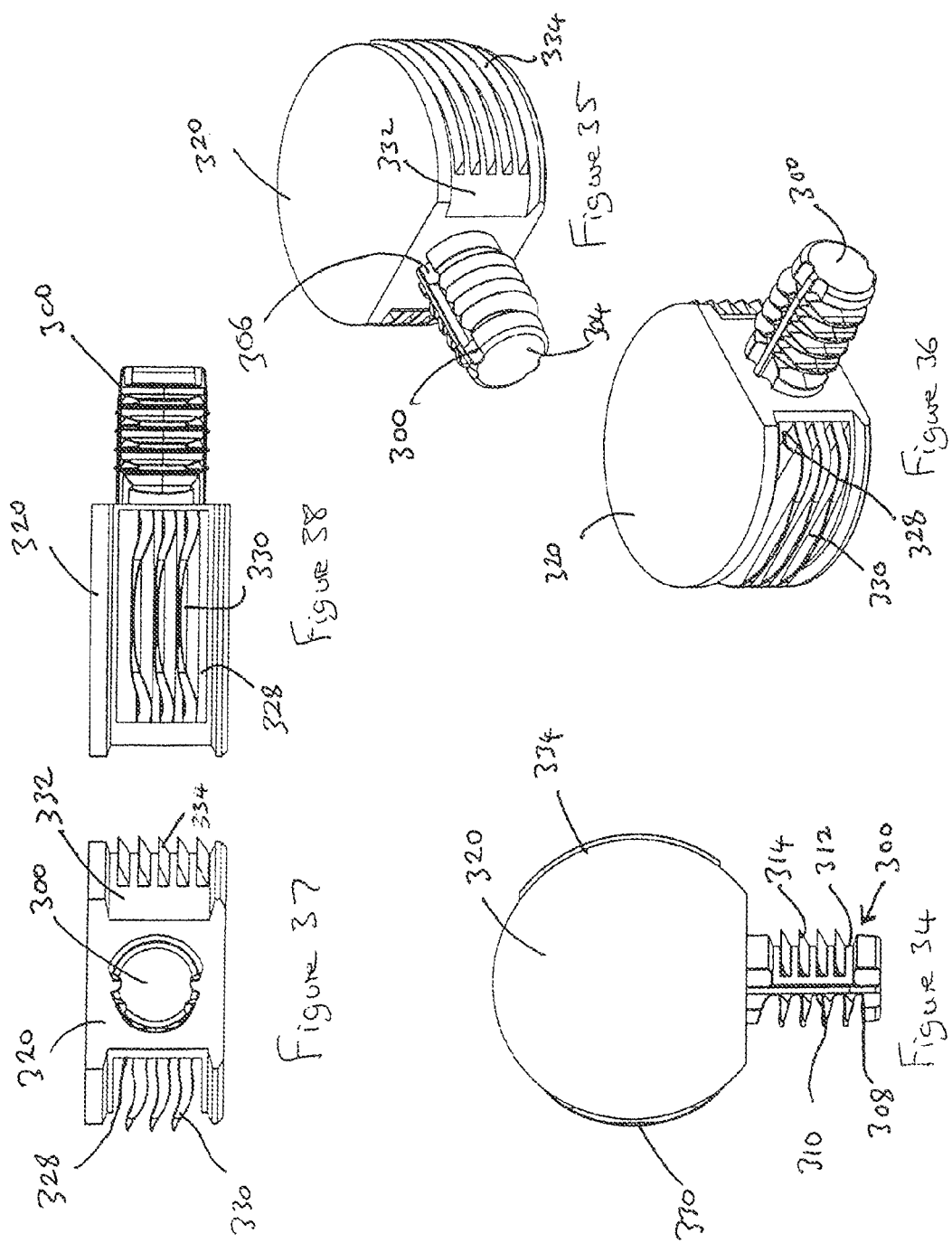

COUPLING ELEMENT FOR AN ARTICLE OF FURNITURE

CROSS REFERENCE TO RELATED APPLICATIONS

The present application is a § 371 national stage of International Application PCT/EP2021/054284, filed Feb. 22, 2021, which claims priority benefit of U.K. Pat. Application Ser. No. 2002910.4, filed Feb. 28, 2020, both of which are hereby incorporated herein by reference in their entireties.

FIELD OF THE INVENTION

This invention relates to a coupling element for an article of furniture and a ready to assemble article of furniture utilising such coupling element.

BACKGROUND OF THE INVENTION

Ready to assemble furniture has been known in the furniture industry for many years. This type of furniture construction provides a number of advantages to the manufacturer, to the retailer, and to the customer. For example, as to the manufacturer, there are significant cost savings in manufacturing unassembled furniture over conventional fully assembled furniture. Ready to assemble furniture can be supplied flat packed, thus requiring less storage space for both the manufacturer and the retailer. The customer ultimately benefits from the lower cost of ready to assemble furniture as opposed to pre-assembled furniture and the ease of transport of flat packed ready to assemble furniture.

Unlike conventional fully or pre-assembled furniture, ready to assemble furniture, as the name implies, requires assembly by the customer. This furniture often requires the use of tools by the customer to enable the manipulation of specialized fittings to assemble and secure the various components of the furniture together. The customers may not have the necessary tools or skill level to assemble the furniture properly. The failure to do so may result in the furniture being unstable, and potentially collapsing during use.

A commonly used type of coupling element in ready to assemble furniture is a dowel pin adapted to be inserted into a hole bored into at least one of two components to be coupled. Traditionally such dowel pins include wooden pins that are inserted into the axially aligned holes in abutting faces of adjacent components along with adhesive for fixing the dowels into the holes. Alternatively, such dowel pins may be cylindrical elongate plastic elements having barbs integrally formed on the sides thereof, the barbs being shaped to hinder or prevent the removal of the dowel pin from the hole into which it is inserted. Such barbs are typically in the form of collars which are circumferentially disposed around the elongate elements.

However, known plastic barbed dowel pins tend to be poor at resisting axial forces acting to remove such dowel pins from the holes.

SUMMARY OF THE INVENTION

According to the present invention there is provided a coupling element including at least one coupling member having a first end and a second end, wherein the coupling member has a flat face on a first side thereof, at least one barb extending in cantilever manner from the flat face and depending away from the first end so as to hinder or prevent the removal of the coupling element from a bore in a surface of a first article into which the first end of the coupling member has been inserted.

The at least one coupling member may include a first plurality of barbs disposed successively therealong from the first end, a first set of the first plurality of barbs extending from the flat face and at least one of the first set of barbs extending in cantilever manner from the flat face of the coupling member.

In one embodiment the at least one coupling member may have a curved face on a second side thereof, opposite the first side, a second set of the first plurality of barbs extending from the curved face. In an alternative embodiment a plurality of ridges or projections may be disposed successively along the second side of the at least one coupling member.

In one embodiment the at least one coupling member may include a dowel, a second plurality of barbs being disposed successively along the coupling member from the second end and depending inwardly from the second end so as to hinder or prevent the removal of the coupling element from a bore in a surface of a second article into which the coupling member has been inserted from the second end, wherein a first set of the second plurality of barbs extend in cantilever manner from the flat face of the first side of the coupling member.

A second set of the second plurality of barbs may extend from the curved face of the second side of the coupling member.

The second end of the at least one coupling member may be attachable to or integrally formed with a second article to be coupled to the first article. In one embodiment the second end of the coupling member may be integrally formed with a male connector for attaching the coupling element to a second article. The at least one coupling member may extend from a base portion of a male connector for attaching the coupling element to a second article. The male connector may include an elongate base member from which the at least one coupling member extends, the second end of the at least one coupling member being coupled to or integrally formed with the base member of the male connector, the male connector including a coupling portion extending from the base member to be received within a slot in the second article or within a female connector mounted therein. The coupling portion may include an elongate ridge having flared sides adapted to retain the coupling portion of the male connector within the slot.

Other types of male connector are envisaged, such as a plug adapted to engage a bore formed in a side face of a first article bore intersecting an edge face from which the coupling member extends when the plug is inserted in the bore such that the coupling member extends from the edge face to engage an aperture in an adjoining face of a second article.

A plurality of the coupling members may extend from the elongate base of the male connector substantially perpendicular to a bottom face of the elongate base and parallel to one another.

The first and second sets of barbs and the first and second pluralities of barbs each include at least three barbs, such as three to ten barbs, or three to six barbs.

Each barb of the first set of barbs may adjoin the flat face of the at least one coupling member via a reduced thickness region serving as a live hinge.

These and other objects, advantages, purposes and features of the present invention will become apparent upon review of the following specification in conjunction with the drawings.

BRIEF DESCRIPTION OF THE DRAWINGS

Coupling elements for joining articles in accordance with various embodiments of the present invention will now be described, by way of example only, with reference to the accompanying drawings, in which:-

FIGS. 1 and 2 are perspective views of a coupling element in accordance with a first embodiment of the present invention;

FIGS. 3 to 5 are respective side views of the coupling element of FIG. 1;

FIG. 6 is an end view of the coupling element of FIG. 1;

FIG. 34 is a front view of a coupling element in accordance with a further embodiment of the present invention;

FIGS. 35 and 36 are perspective views of the coupling element of FIG. 34;

FIG. 37 is an end view of the coupling element of FIG. 34; and

FIG. 38 is a side view of the coupling element of FIG. 34.

DESCRIPTION OF THE PREFERRED EMBODIMENTS

Figure 7A:
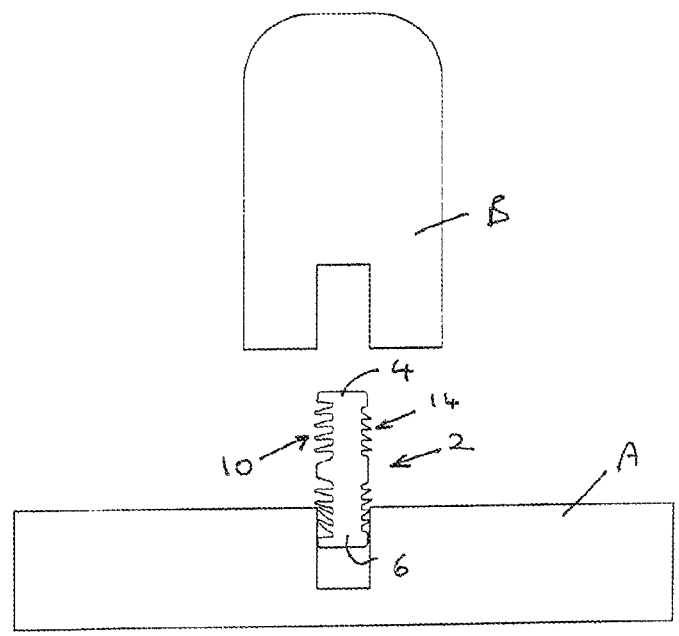
FIGS. 7*a* and 7*b* are sectional views illustrating the coupling element of FIG. 1 in use.

A coupling element in accordance with a first embodiment of the present invention is illustrated in FIGS. 1 to 6. In this first embodiment, the coupling element is in the form of a dowel for joining abutting faces of two articles A, B (FIGS. 7*a* and 7*b*) by insertion into axially aligned holes or blind bores. The coupling element includes a coupling member 2 having a first end 4 and a second end 6, the first end 4 of the coupling member being insertable into a first hole formed in a surface of the first article A and the second end 6 being insertable into a second hole formed in a surface of the second article B. A first plurality of barbs is disposed successively along the coupling member from the first end and depending away from the first end so as to hinder or prevent the removal of the coupling element from the respective bore into which the first end of the coupling member has been inserted, and a second plurality of barbs are disposed successively along the coupling member from the second end and depending inwardly from the second end so as to hinder or prevent the removal of the coupling element from the hole into which the second end of the coupling member has been inserted.

The coupling member 2 has a flat face 8 on a first side thereof, a first set 10 of each of the first and second plurality of barbs extending in cantilever manner from the flat face 8, the coupling member 2 having a curved face 12 on a second side thereof, opposite the first side, a second set 14 of the first and second plurality of barbs, having an arcuate shape, extending from the curved face 12.

The outermost ends of the first and second sets of barbs 10, 14 of the first and second plurality of barbs are shaped to define a substantially cylindrical outer surface of the coupling element of slightly larger diameter than that of the holes or bores into which it is intended to insert the coupling element.

Figure 7B:
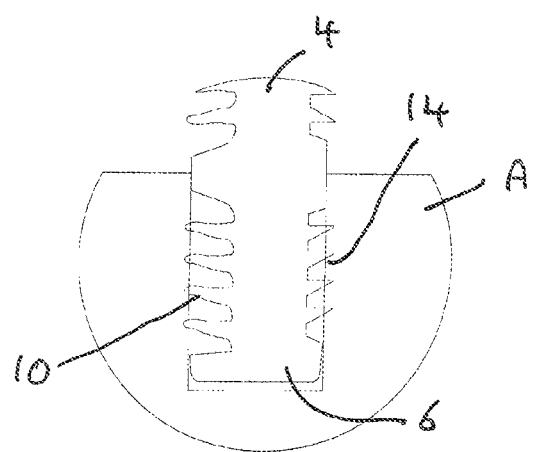
Figure 8:
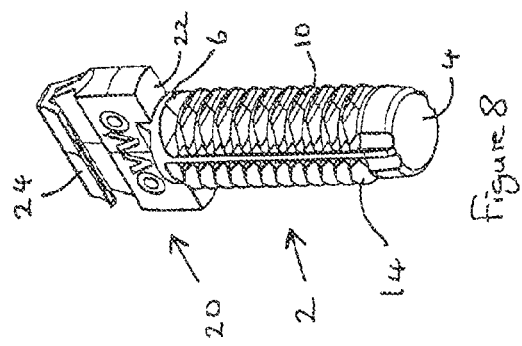
FIG. 8 is a perspective view of a coupling element in accordance with a second embodiment of the present invention.
Figure 11:
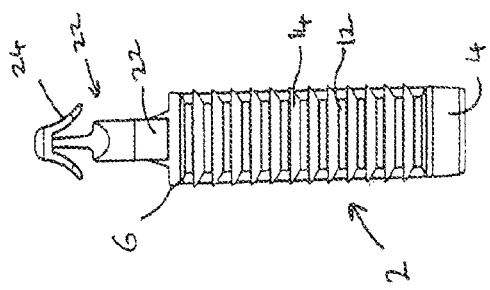
FIGS. 9 to 11 are respective side views of the coupling element of FIG. 7.
Figure 12:
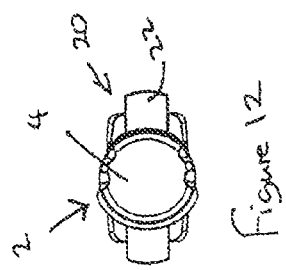
FIG. 12 is an end view of the coupling element of FIG. 7.
Figure 10:
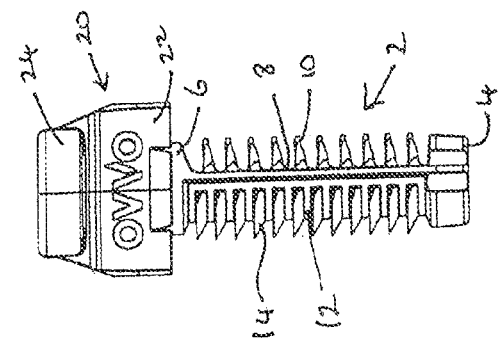
Figure 9:
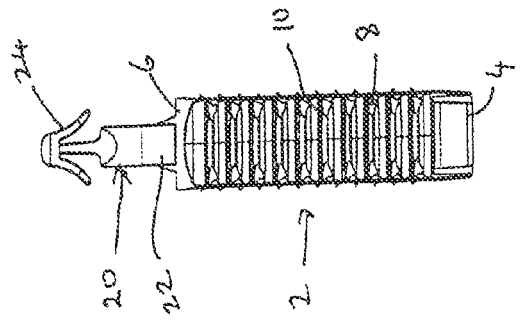
Figure 13:
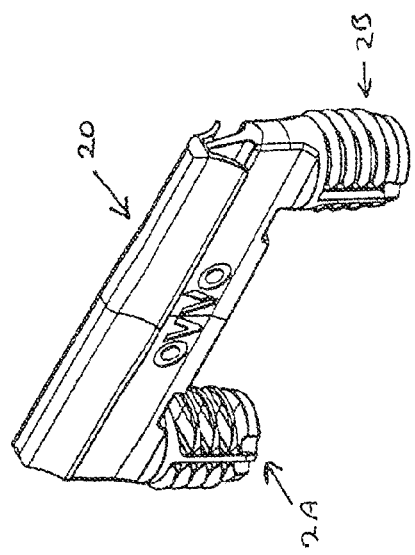
FIGS. 13 and 14 are perspective views of a coupling element in accordance with a third embodiment of the present invention.
Figure 14:
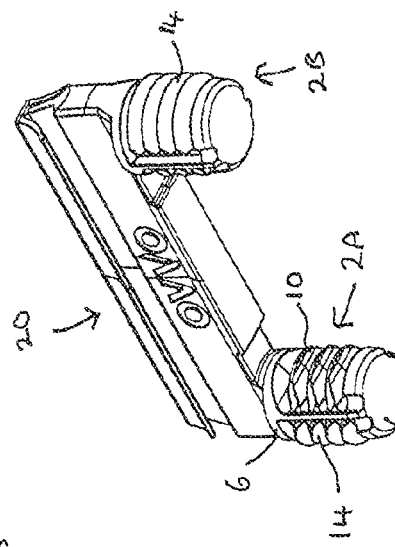
Figure 17:
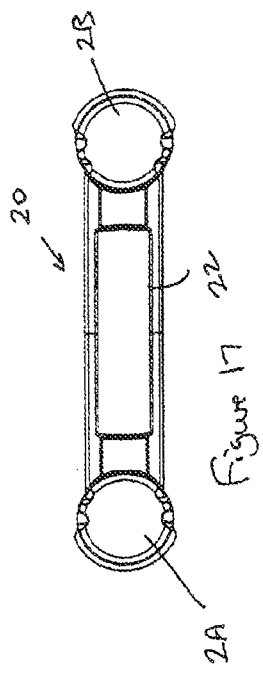
FIG. 17 is a plan view from below of the coupling element of FIG. 13.
Figure 15:
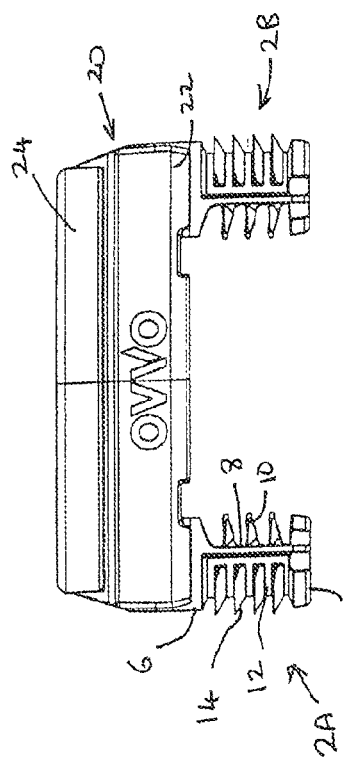
FIG. 15 is a side view of the coupling element of FIG. 13.
Figure 18:
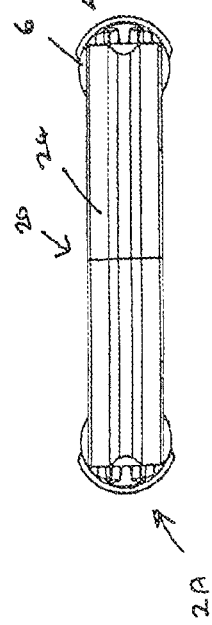
FIG. 18 is plan view from above of the coupling element of FIG. 13.
Figure 16:
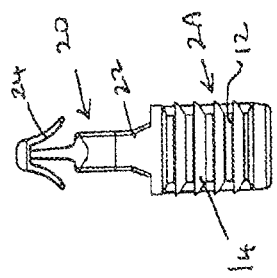
FIG. 16 is an end view of the coupling element of FIG. 13.
Figure 19:
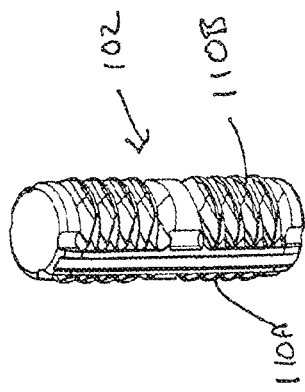
FIG. 19 is a perspective view of a coupling element in accordance with a further embodiment of the present invention.
Figure 20:
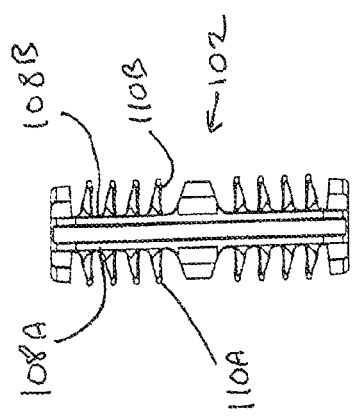
FIGS. 20 and 21 are side views of the coupling element of FIG. 19.
Figure 22:
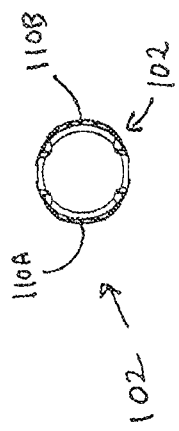
FIG. 22 is an end view of the coupling element of FIG. 19.
Figure 21:
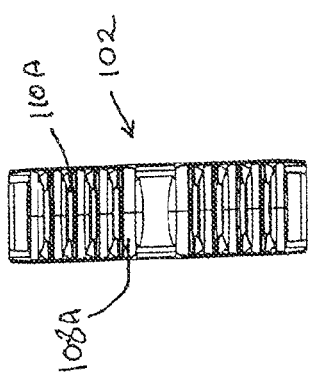

In use, as illustrated in FIGS. 7*a* and 7*b*, the first and second ends 4, 6 of the coupling element are inserted into respective holes or blind bores in abutting faces of first article A and second article B to be coupled together, each hole or blind bore having a diameter slightly less than that of the outer diameter of the coupling element, such that the first and second plurality of barbs are compressed inwardly as the respective end of the coupling element is inserted therein. Each of the first and second sets 10, 14 of the first and second plurality of barbs face away from the respective first and second ends 4, 6 of the coupling member 2 defining the coupling element such that the barbs 10, 14 resist removal of the coupling element from the holes or blind bores into which it is inserted.

Each first set of the first and second plurality of barbs 10 extend in cantilever manner from the flat face 8 of the coupling member to provide enhanced resistance to removal by virtue of the first sets of barbs 10 being longer than the arcuate second sets of barbs 14 extending from the second curved face 12 of the second side of the coupling member 2, the first sets of barbs 10 providing a relatively strong lever action against the sides of the hole or bore compared to known arcuate barbs, such that the first sets of barbs 10 act to urge the second sets 14 of barbs against the side of the respective hole or bore into which the coupling element is inserted, thereby providing enhanced resistance to removal of the coupling element from the holes or bores into which it is inserted. As illustrated in FIG. 7*b*, the first set of barbs 10 have forced the opposite less-flexible second set of barbs 14 further into the sides of the respective bore or hole, whereby making the coupling member easy to push into the respective hole or bore but difficult to remove. Because of the flexibility in the first set of barbs 10, the resistance in insertion is reduced but when pulling out—the barbs 10, 14

'bite' in deeper into the sides of the bore, thereby increasing the residual strength in the coupling.

Each barb of the first set of barbs 10 may adjoin the flat face 8 of the coupling member 2 via a reduced thickness region serving as a live hinge. When pushed into a hole, a recess or a channel each first set of barbs 10 act in such a way as to apply pressure onto the opposite side of the hole, recess or channel, allowing that side to be wedged or imbedded into the wall of the hole, recess or channel.

The cantilevered first sets of barbs 10 force the opposite second sets of barbs 14 to 'pinch' on the adjacent side of the bore/hole increasing the residual holding strength and making it harder to remove.

Additionally, when a force is acting to remove the coupling element from the hole, recess or channel into which it has been inserted, this force is converted by the cantilevered barbs 10 into a more sidewards pushing force, which in turn applies more pressure onto the barbs 14 on the opposite side of the elongate coupling element, allowing that side to be further wedged or imbedded into the side wall of the hole or channel.

It should also be noted that the cantilevered barbs 10 are shaped in such a way that only a small amount of a downward force is required to push the coupling element into a hole or channel.

By providing the first and second set of barbs 10, 14 of each of the first and second plurality of barbs on opposite first and second sides of the coupling member 2, the barbs 10, 14 act against the inner sides of a hole or blind bore into which the respective end of the coupling member 2 is inserted on diametrically opposed sides of the hole or bore. Advantageously, this enables the coupling element to be inserted into a hole or bore in an edge of a panel without the risk of splitting the panel by aligning the first and second sets of barbs 10, 14 along the length of the panel, thereby minimising outwards forces perpendicular to the side faces of the panel and any bulging of the side faces of the panel.

In an alternative embodiment, illustrated in FIGS. 8 to 12, the coupling element includes a coupling member 2 having a first end 4 and a second end 6, the first end 4 of the coupling member being insertable into a first hole or blind bore formed in a surface of a first article and the second end 6 being integrally coupled to a further connector portion 20 for attaching the coupling element to a second article. As before, the coupling member 2 has a plurality of barbs therealong for retaining the coupling member in a hole or blind bore into which it is inserted, the coupling member having a flat face 8 on a first side thereof, a first set of the plurality of barbs 10 extending in cantilever manner from the flat face 8, and a curved face 12 on a second side thereof, opposite the first side, a second set of the plurality of barbs 14, having an arcuate shape, extending from the curved face 12.

As shown in FIGS. 8 to 12, the further connector portion 20 may include male connector having an elongate base member 22 from a lower face of which the coupling member 2 extends, the second end 6 of the coupling member 2 being coupled to or integrally formed with the lower face of the base member 22 of the male connector 20, the male connector including a coupling portion 24 extending from the base member 22 to be received within a slot in the second article or within a female connector mounted therein. The male connector 20 may be of the type disclosed in EP 2663212, which corresponds to U.S. Pat. No. 9,714,673, which are incorporated herein by reference, wherein the coupling portion includes a central rib extending outwardly from the base member, a distal end of the central rib supporting a pair of outwardly flared symmetrically arranged resilient wings on either side thereof, the wings extending towards the base member, the resilient wings have a substantially arrow head shaped cross section extending on either side of the central rib to be retained in a receiving slot formed in face of a second article of in a respective female coupling mounted in a face of the second article. It is envisaged that the further connector portion 20 may be adapted for numerous functions, with numerous different constructions to enable the coupling element to be used with different products and articles.

The first and second sides of the coupling member 2 may be aligned with respect to the base member 22 of the male connector 20 such that the flat face 8 of the first side of the coupling member 2 extends substantially transverse to an elongate axis of the elongate base member 22 of the male connector 20, the first set of barbs 10 extending towards one end of the elongate base member 22, enabling the coupling element to be inserted into a hole in an edge of a panel without the risk of splitting the panel by aligning the first and second sets of barbs 10, 14 with the length of the panel.

In a further embodiment, illustrated in FIGS. 13 to 18, the coupling element includes a male connector 20 having an elongate base member 22 a coupling portion 24 extending from the base member 22 to be received within a slot in the second article or within a female connector mounted therein, the base member being longer than that of the embodiment shown in FIGS. 7 to 12. Due to the increased length of the male connector 20, a respective coupling member 2A, 2B extends from either end of the base member 22 of the male connector 20, the coupling members 2A, 2B extending parallel to one another and perpendicular to a lower face of the base member 22.

Each coupling member 2A, 2B includes a plurality of barbs disposed successively therealong, the plurality of barbs depending away from a distal end of the respective coupling member 2A, 2B so as to hinder or prevent the removal of the each coupling member 2A, 2B from a respective hole or bore into which it is inserted.

As before, each coupling member 2A, 2B has a flat face 8 on a first side thereof, a first set of the plurality of barbs 10 thereof extending in cantilever manner from the flat face 8, each coupling member 2A, 2B having a curved face 12 on a second side thereof, opposite the first side, a second set of the plurality of barbs 14, having an arcuate shape, extending from the curved face 12.

In the embodiment shown, the male connector member 20 includes a central rib extending outwardly from the base member, a distal end of the central rib supporting a pair of outwardly flared symmetrically arranged resilient wings on either side thereof, the wings extending towards the base member, the resilient wings have a substantially arrow head shaped cross section extending on either side of the central rib. Each wing may be curved in an outwards direction away from the respective central rib from the base region to the free ends of the wings. The resilient wings of the male connector are resiliently displaceable towards to the central rib to enable the wings to pass through a narrowed neck region of a receiving slot in an article or a female connector member mounted in a slot formed in a face of an article, the ends of the resilient wings engaging shoulders of the receiving slot of female connector once the male connector has been inserted therein to retain the male connector therein. However, other types of male connector or alternative connector portions are envisaged.

Again, the first and second sides of each coupling member 2A, 2B may be aligned with respect to the base member 22 of the male connector 20 such that the flat face 8 of each coupling member extends substantially transverse to an elongate axis of the base member 22 of the male connector 20 so that the barbs 10, 14 are aligned along the length of the male connector 20. This enables the coupling element to be inserted into a hole in an edge of a panel without the risk of splitting the panel by aligning the first and second sets of barbs with the length of the panel. In the embodiment shown in FIGS. 13 to 18 the flat faces 8 of the coupling member 2A, 2B face one another so that the first set of barbs 14 of each coupling member are arranged to extend away from a respective adjacent outer end of the elongate base member 20.

As illustrated in FIGS. 19 to 22, in an alternative embodiment the coupling element 102 may have first and second flat faces 108A, 108B on both first and second sides thereof, a respective first and second plurality of barbs 110A, 110B extending in cantilever manner from each of the first and second flat faces 108A, 108B. This arrangement may provide an enhanced anchoring effect to prevent removal of either end of the coupling element from a hole into which it is inserted.

Figure 25:
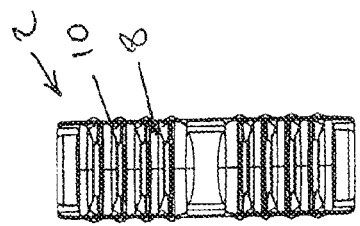
FIGS. 23 to 25 are side views of a coupling element in accordance with a further embodiment of the present invention.
Figure 23:
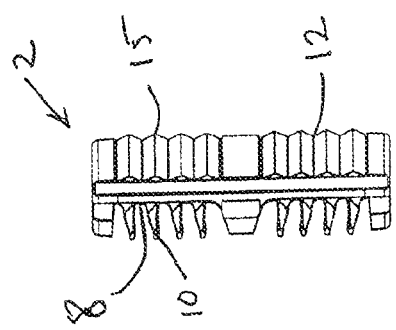
Figure 24:
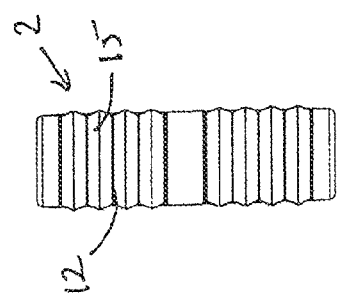
Figure 28:
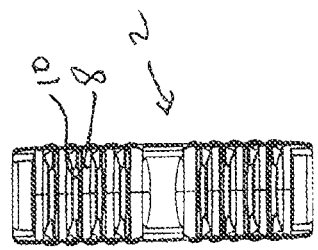
FIGS. 26 to 28 are side views of a coupling element in accordance with a further embodiment of the present invention.
Figure 26:
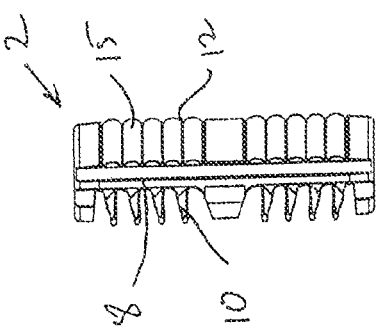
Figure 29:
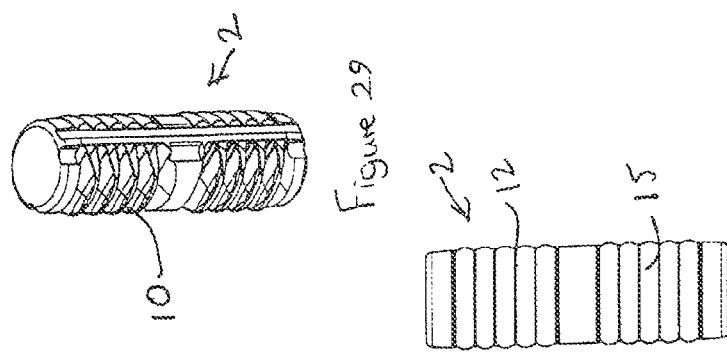
FIG. 29 is a perspective view of the coupling element of FIGS. 26 to 28.
Figure 27:
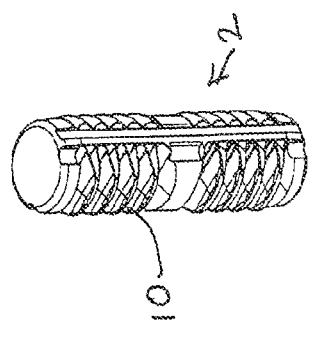
Figure 30:
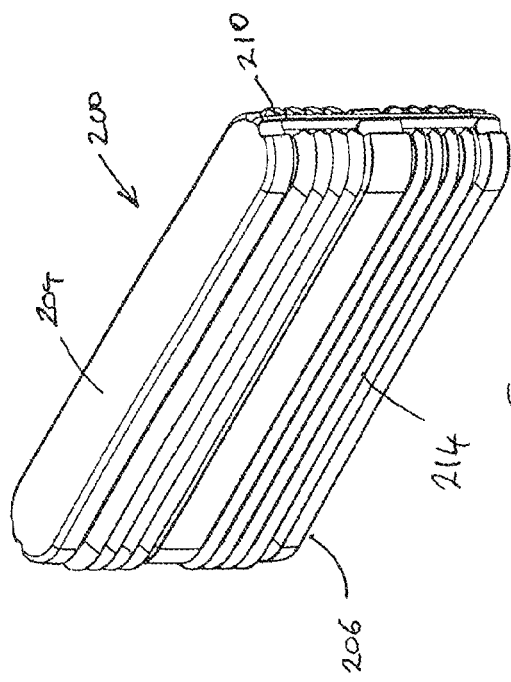
FIG. 30 is a perspective view of a coupling element in accordance with a further embodiment of the present invention.
Figure 33:
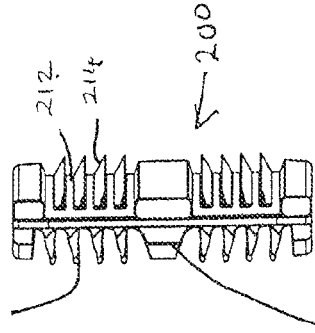
FIGS. 32 and 33 are end views of the coupling element of FIG. 30.
Figure 31:
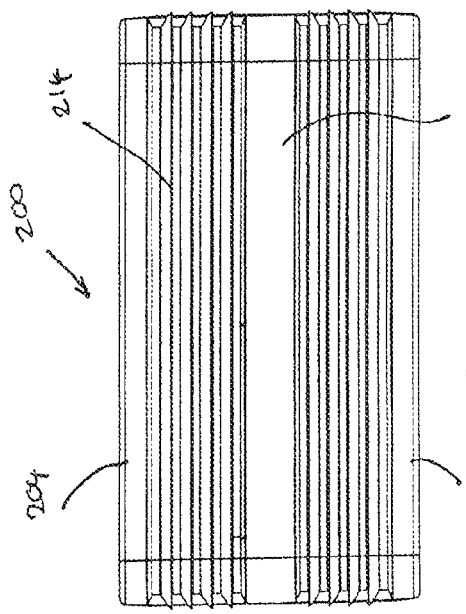
FIG. 31 is a side view of the coupling element of FIG. 30.
Figure 32:
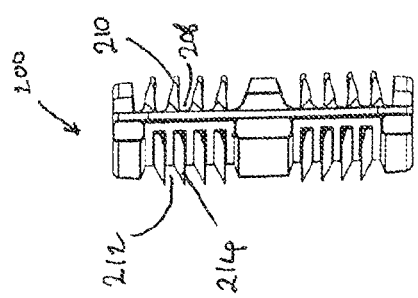

As illustrated in FIGS. 23 to 25, in an alternative embodiment the curved face 12 on the second side of the coupling element 2 may have a plurality of ridges 15 formed thereon instead of barbs, the ridges 15 being pushed into gripping engagement with a side wall of a hole into which the coupling element 2 is inserted by the pressure applied onto the opposite side of the hole by the cantilevered barbs 10 provided on the flat face 8 of the first side of the coupling element 2.

In the embodiment illustrated in FIGS. 26 to 29, in a further embodiment the ridges 15 on the curved side 12 of the coupling element 2 may have a rounded outer profile.

As illustrated in FIGS. 30 to 33, a coupling element in accordance with a further embodiment of the invention may be adapted to be inserted into opposing slots or channels in components to be coupled, the coupling element 200 in the form of an elongated dowel for joining abutting faces of two articles by insertion into axially aligned slots or channels, the coupling element 200 having a first end 204 and a second end 206, the first end 204 of the coupling element being insertable into a first slot or channel formed in a surface of the first article and the second end 206 being insertable into a second slot or channel formed in a surface of the second article.

A first set of barbs 210 are provided on one a first side 208 of the coupling element 200 while a second set of barbs 214 are provided on a second side 212 of the coupling element 200. The first set of barbs 210 extend in cantilever manner from the flat first side 208 of the coupling element 200. A second set of barbs 214 extend from the second side 212 of the coupling element 200, the second set of barbs 214 being shorter than the first set of barbs 210 and extending around curved ends of the coupling element at either end of the first side 212.

As with previous embodiments, the cantilevered first sets of barbs 210 force the opposite second sets of barbs 214 against the adjacent side of the slot or channel into which the coupling element 200 is inserted, increasing the residual holding strength and making the coupling element harder to remove.

Additionally, when force acting to remove the coupling element 200 from the slot or channel into which it has been inserted, this force is converted by the cantilevered barbs 210 into a more sidewards pushing force, which in turn applies more pressure onto the barbs 214 on the opposite side of the elongate coupling element, allowing that side to be further wedged or imbedded into the side wall of the slot of channel into which it is inserted.

In a further embodiment, illustrated in FIGS. 34 to 38, the coupling element includes a coupling member 300 having a first end 304 and a second end 306, the first end 304 of the coupling member being insertable into a first hole or blind bore formed in a surface of a first article and the second end 306 being integrally coupled to a further connector portion 320 for attaching the coupling element to a second article. As before, the coupling member 300 has a plurality of barbs therealong for retaining the coupling member in a hole or blind bore into which it is inserted, the coupling member having a flat face 308 on a first side thereof, a first set of the plurality of barbs 310 extending in cantilever manner from the flat face 308, and a curved face 312 on a second side thereof, opposite the first side, a second set of the plurality of barbs 314, having an arcuate shape, extending from the curved face 312. It is envisaged that the second side may also include a flat face having cantilevered barbs, as described in relation to FIGS. 19 to 22, or may just incorporate ribs or ridges, as described in relation to FIGS. 23 to 29.

In this embodiment, the further connector portion may include a plug 320 adapted to be fitted into a bore formed in a side face of a first article bore intersecting an edge face from which the coupling member 300 extends when the plug 320 is inserted in the bore such that the coupling member 300 extends from the edge face to engage an aperture in an adjoining face of a second article. In the embodiment shown in FIGS. 34 to 38, in the same manner as provided on the coupling member 300, the plug 320 includes a flat face 328 on a first side thereof from which extends a first plurality of barbs 330 in cantilever manner for engaging an inner wall of the bore into which the plug 320 is inserted to retain the plug 320 within the bore. A second plurality of barbs 334, having an arcuate shape, extend from a curved face 332 on a second side of the plug 320.

The invention is not limited to the embodiments described herein but can be amended or modified without departing from the scope of the present invention, which is intended to be limited only by the scope of the appended claims as interpreted according to the principles of patent law including the doctrine of equivalents.

The invention claimed is:

1. A coupling element comprising:
a pair of opposing dowel pins each having a distal end and a proximal end;
a male connector comprising an elongate base member to which said dowel pins are coupled at their respective proximal ends on a side thereof, and a coupling portion extending from said elongate base member on an opposing side thereof opposite the dowel pins;
wherein each of said dowel pins comprises:
a flat face on a longitudinally-extending side thereof and a curved face on an opposing longitudinally-extending side thereof;
a first set of barbs spaced along said flat face and extending therefrom in a cantilever manner from said distal end toward said proximal end, and a second set of barbs spaced along said curved face and extending therefrom in a cantilever manner from said distal end toward said proximal end, said first set of barbs flexibly forming live hinges, and depending away from said distal end so as to hinder or prevent removal of said dowel pin from a bore in a surface of a first article into which said distal end of said dowel pin has been inserted; and wherein said flat faces of said dowel pins are directed inwardly toward one another and said curved faces of said dowel pins are directed outwardly away from one another; and wherein said coupling portion of said male connector is configured to be received within a slot in a second article or within a female connector mounted therein.

2. The coupling element of claim 1, wherein said proximal end of each said dowel pin is attachable to the second article to be coupled to the first article via said male connector.

3. The coupling element of claim 2, wherein said proximal end of each said dowel pin is integrally formed with said male connector.

4. The coupling element of claim 1, wherein said proximal end of each said dowel pin is integrally formed with said elongate base member of said male connector.

5. The coupling element of claim 1, wherein said coupling portion comprises an elongate ridge having flared sides adapted to retain said coupling portion of said male connector within said slot.

6. The coupling element of claim 1, wherein said pair of dowel pins extend from said elongate base member of said male connector substantially perpendicular to a bottom face of said elongate base member and parallel to one another.

7. The coupling element of claim 1, wherein said first and second sets of barbs each comprise at least three barbs.

8. The coupling element of claim 1, wherein each barb of said first set of barbs adjoins said flat face of said dowel pin via a reduced thickness region serving as said live hinge.

9. The coupling element of claim 1, wherein said first and second sets of barbs each comprise three to ten barbs.

10. The coupling element of claim 1, wherein said first and second sets of barbs each comprise three to six barbs.

* * * * *